March 8, 1966     I. F. SCHRECK     3,239,025

TRUCK STEERING GEAR

Filed March 23, 1964     2 Sheets-Sheet 1

INVENTOR
*Irvin F. Schreck*

BY *McCoy, Greene, Miedert*
*& Je Grotenhuis*
ATTORNEYS

March 8, 1966  I. F. SCHRECK  3,239,025
TRUCK STEERING GEAR

Filed March 23, 1964  2 Sheets-Sheet 2

INVENTOR
Irvin F. Schreck
BY McCoy, Greene, Medert
& TeGrootenhuis
ATTORNEYS

United States Patent Office 3,239,025
Patented Mar. 8, 1966

3,239,025
TRUCK STEERING GEAR
Irvin F. Schreck, 2272 Walden Ave., Cleveland, Ohio
Filed Mar. 23, 1964, Ser. No. 354,025
13 Claims. (Cl. 180—79.2)

The present invention relates to an improved gear-type steering mechanism for fork-lift trucks and other industrial trucks and more particularly to a power steering mechanism which provides accurate control of widely spaced steered wheels.

Heretofore, accurate steering of industrial trucks has been obtained using a gear-type mechanism as disclosed in my U.S. Patent No. 2,848,247, filed May 5, 1955. Such mechanism required unduly large gears when the truck had two motor-driven steered wheels which were widely spaced. Smaller gears could be used to effect steering of such a truck by employing a chain-and-sprocket arrangement as disclosed in my U.S. Patent No. 2,982,564 but such arrangement was not fully satisfactory because of the play in the chains and was impractical for heavy trucks having two motor-driven steered wheels which were widely spaced. A solution to the problem was difficult to find because of the necessity of maintaining proper steering geometry through short radius turns.

It has now been discovered that very accurate power steering and excellent tire wear can be obtained by an improved arrangement of steering gears wherein each of the main circular steering gears usually has a radius less than one-fifth the distance between the vertical turning axes of said gears.

The improved steering mechanism of this invention is specially designed for heavy trucks having two motor-driven wheels carried by the two main steering gears and having a hydraulic power system to effect turning of both wheels simultaneously. A power cylinder is connected to a pair of auxiliary gears, which are positioned between the main steering gears, to move corresponding points thereon spaced from their centers in a direction generally parallel to the line of centers of the main steering gears, and means are provided to constrain movement of each auxiliary gear so that it moves bodily in a direction generally perpendicular to said line of centers or tangent to the main circular gears, whereby turning movement is imparted to both wheels simultaneously and the directions of the wheels are properly controlled to minimize tire wear (see FIGURE 6).

The two circular auxiliary gears are preferably connected together by link means or the like to move bodily substantially in unison. The size of each gear necessary to provide proper steering geometry depends on the lateral distance between the turning axes of the steered wheels at one end of the trunk and also on the longitudinal distance between the front and rear wheels. In the truck shown herein, the auxiliary gears preferably have a radius at least equal to that of the main wheel-carrying gears.

An object of the present invention is to minimize tire wear on an industrial truck having two widely spaced motor-driven steering wheels.

A further object of the invention is to provide a simple and effective power steering mechanism for a heavy industrial truck having two motor-driven wheels.

Another object of the invention is to provide a simple and inexpensive two-wheel steering mechanism for wide industrial trucks which employs relatively small gears and yet provides a close approximation to a theoretically correct steering action throughout 90 degree turns to minimize wear on the tires.

Other objects, uses and advantages of the invention will become apparent to those skilled in the art from the following description and claims and from the drawings, in which:

Figure 1:
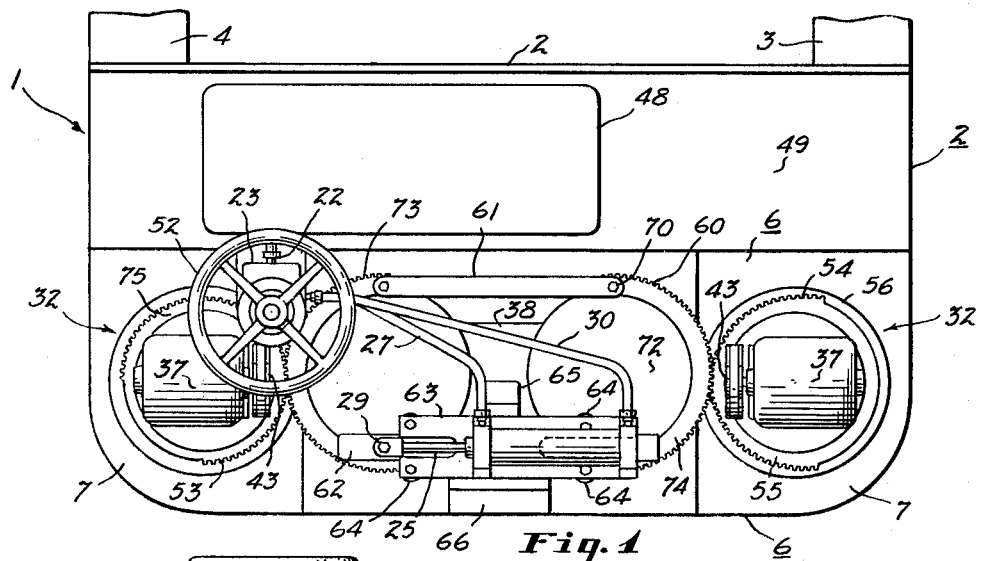
FIGURE 1 is a fragmentary top plan view on a reduced scale showing the main elements of an industrial truck employing the power steering mechanism of the present invention.
Figure 2:
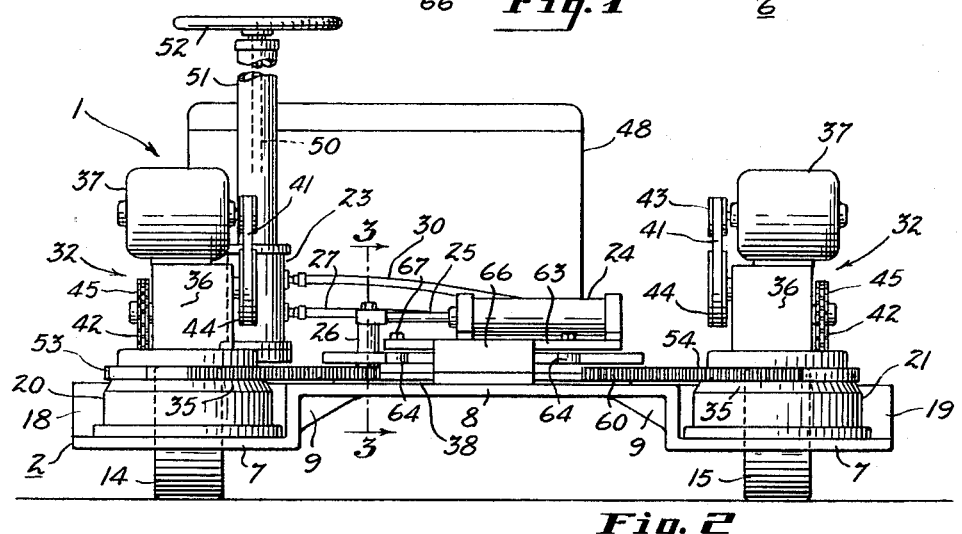
FIGURE 2 is a foreshortened end elevational view of the truck of FIGURE 1 on the same scale, a portion of the steering column being broken away to reduce the height of the view.
Figure 6:
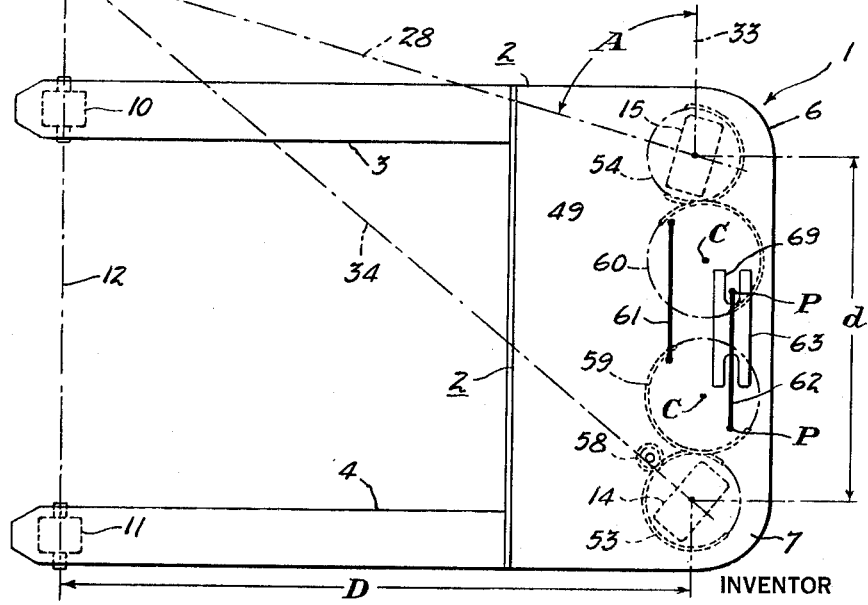
FIGURE 6 is a diagrammatic view of the truck of FIGURES 1 and 2 showing one position of the gears during a sharp turn.

Referring more particularly to the drawings, in which like parts are identified by the same numerals throughout the several views, FIGURES 1, 2 and 6 show a 4-wheel battery-operated industrial truck 1 having a rigid frame 2, a pair of spaced, parallel forwardly extending, supporting arms 3 and 4, and a main supporting portion 6. The truck may be provided with a fork lift or other conventional equipment, but such details are unnecessary for an understanding of the invention and are not shown on the truck. The truck may, for example, be of the general type disclosed in my U.S. Patent No. 2,848,247 but having a wider frame. As herein shown, the frame portion 6 has lower side portions 7 to receive the turrets 20 and 21 and a generally flat horizontal portion 8 reinforced with gusset plates 9. Forwardly of the portion 6 the truck has a riding platform 49 and a battery hooding 48. Small wheels 10 and 11 are mounted on the front portions of the arms 3 and 4 for rotation on the common fixed horizontal axis 12, and larger swiveled wheels 14 and 15 are mounted on the rear portion of the truck for rotation about horizontal axes 34 and 28, respectively, with the line of centers of said wheels parallel to the axis 12.

The traction wheels 14 and 15 may be mounted on the truck in any suitable manner so as to pivot about a substantially vertical axis. As herein shown, the steered wheels 14 and 15 are rotatably mounted in fixed positions on turrets or wheel supports 20 and 21 which turn about vertical axes containing the centers of the wheels. The turrets are rotatably mounted in circular openings on the side portions 7 of the frame by means of rigid bearing members 18 and 19 and function generally like the motor-supporting turret shown in said U.S. Patent No. 2,848,247. Each turret has a flat upper portion 35 which supports a lower unit 32 including a conventional gear reduction unit 36, a reversible electric motor 37 and other means for driving the steered wheel.

The driving mechanism for each of the wheels 14 and 15 may be generally of the type disclosed in said Patent No. 2,848,247 and may effect driving of the wheel through sprockets, chains, gears or the like which reduce the relatively high speed of rotation of the motor 37 to a relatively low speed of turning of the wheel. As herein shown, each of the wheels 14 and 15 is driven from its associated electric motor 37 through the belt 41, upper and lower pulleys 43 and 44, reduction gears in the unit 36, upper sprocket wheel 45, chain 42, and a lower sprocket wheel (not shown) which is rigidly mounted on the hub of the wheel. As in the truck disclosed in said patent, the electric motor, the gear reduction unit and the traction wheel are combined into one power unit 32 carried by each of the turrets 20 and 21. Each of the traction wheels 14 and 15 is thus supplied with power from the electric motors to drive the truck in any direction.

Where two motor-driven wheels are mounted to turn and effect steering, it is essential that the wheels of the truck be turned positively with a minimum amount of play and that the angular positions of the wheels be accurately controlled to minimize tire wear. A steering mechanism of the type shown in my U.S. Patent No. 2,848,247 functions satisfactorily in such a truck but requires main gears with a diameter at least about half the distance between the centers of the main gears and is, therefore, cumbersome for wide trucks. The steering mechanism of this invention solves the problem by eliminating the need for unduly large gears.

The steering mechanism of this invention includes a pair of circular main gears 53 and 54 which are operably connected to the turrets 20 and 21, to steer the traction wheels 14 and 15, and includes auxiliary gear means for causing relative rotation of the main gears as a function of the total rotation thereof so as to maintain said wheels substantially perpendicular to the radius of turning of the truck 1 (see FIGURE 6). As herein shown, a pair of generally circular main ring gears 53 and 54 are rigidly mounted on the turrets 20 and 21, respectively, coaxial therewith for rotation with the turrets about vertical axes which pass through the centers of the wheels 14 and 15 at their horizontal axes of rotation. The gears may be of various types and may have different pitches but are preferably circular toothed gears of the same pitch and the same radius. The teeth may extend throughout the circumference of both main gears, in which case both main gears preferably (but not necessarily) have the same number of teeth; however, fewer teeth are required because it is unnecessary to rotate each main gear more than 90 degrees in either direction from the straight-ahead position shown in FIGURES 1 and 2.

As herein shown, the gear 54 has a peripheral toothed portion 55 with teeth of uniform radius throughout about half of the circumference of the gear, and the remainder of the gear is smooth and reduced in radius. The gear 53 is shaped in a similar manner and has a peripheral toothed portion 75 with teeth of uniform radius throughout more than half of the circumference of the gear. The portions 55 and 75 of the gears preferably extend circumferentially about 180 to 220 degrees.

As pointed out in my Patent No. 2,848,247, it is often desirable to provide stop means to limit turning movement of the gears 53 and 54. If desired the toothed peripheral portion 55 of the main gear 54 may be provided with stop shoulders 56 and 57 similar to those described in said patent and the radius of the portion 55 may be increased somewhat adjacent each of said shoulders to assist in slowing down the turning movement as the gear approaches the limit of its movement in either direction.

As herein shown, the gears 53 and 54 have the same pitch diameter and the same size teeth. A small pinion gear 58 is provided with teeth meshing with the teeth of the gear 53, and the handwheel 52 at the top of the steering post 51 is operably connected to said pinion gear through the vertical steering shaft 50 to steer the truck to the right or left. The operator riding on the platform 49 may grip the handwheel to control the steering.

The vertical shaft 50 is operably connected to the pinion gear 58 and may be rigidly connected to the pinion gear when the truck is relatively small and power steering is omitted, but it is preferable to provide power steering mechanism including a conventional steering control valve 23 connected between the upper steering shaft 50 and the lower shaft portion 50a whereby a slight turning force on the handwheel 52 moves the valve to divert hydraulic fluid from the inlet 22 to the hydraulic cylinder 24 through fluid line 27 or 30. The fluid pressure acting on the piston of the motor 24 causes the piston rod 25 to move to the right or the left and adds to the manual force applied by the pinion gear 58 to effect turning of the main gears 53 and 54. The elements of the control valve 23 and the hydraulic motor are not described in detail because they are well known in the art, but the novel cooperation of these elements with the steering gear mechanism is shown and is described hereinafter.

While best results are obtained when the power steering mechanism includes a reciprocating hydraulic motor connected to the bar 61 or 62, advantages of the invention are also obtained when the hydraulic motor, controlled by the steering shaft 50, is used to apply a turning force directly to the pinion gear 58. Various known servomotors may be used including one of the general type disclosed in U.S. Patent No. 2,370,137.

In the steering mechanism of this invention, the gear means between the main gears 53 and 54 includes a pair of auxiliary circular gears 59 and 60, which are preferably of the same radius and the same pitch and have teeth extending at least about half way round the circumference of the gear. The auxiliary gear 59 has a flat horizontal portion 71 and a toothed peripheral portion 73 rigidly mounted thereon, and the gear 60 has a similar flat portion 72 and a similar toothed peripheral portion 74 rigidly connected thereto. The gear portions 71 and 72 are slidably supported by a flat wear plate 38 carried by frame portion 8.

Means are provided for constraining movement of both of the gears 59 and 60 so that the centers C thereof move in unison in a direction generally perpendicular to the line of centers 33 of the main gears 53 and 54 and corresponding points P on said gears move in unison in a direction generally parallel to said line of centers in response to movement of the piston rod 25. The means for constraining the gears 59 and 60 includes a straight horizontal bar 62 of rectangular cross section, which is parallel to the line of centers 33 and perpendicular to the axes of rotation of the meshing gears 53, 54, 59 and 60, a guide member 63 in the form of a flat horizontal plate rigidly mounted on the frame portion 8 by two mounting brackets 65 and 66, and four guide rollers 64 supported on the four corners of the guide member 63 by four vertical pins 67 for rotation about vertical axes and located to engage the flat vertical side faces of the bar 62. The axes of the four rollers 64 are located in two vertical planes located on opposite sides of the bar 62 and parallel to the line of centers 33 so that the horizontal bar 62 is constrained to move in a horizontal direction parallel to said line of centers and parallel to the horizontal axis 12. The opposite ends of the bar 62 are pivotally connected to the gears 59 and 60 by two vertical threaded pivot pins 68 and 68a which are screwed into the gears, whereby each gear turns relative to the bar 62 about a vertical axis at the point P of that gear.

Figure 3:
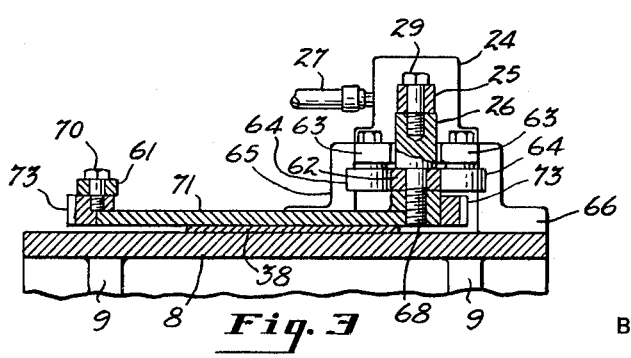
FIGURE 3 is a fragmentary longitudinal vertical sectional view taken on the line 3—3 of FIGURE 2 and on a larger scale.

The constraining means for the auxiliary gears 59 and 60 also includes auxiliary means for maintaining the teeth of said gears in mesh with the teeth of the main gears 53 and 54 and for causing the auxiliary gears to move bodily in a direction transverse to the line of centers 33 or substantially tangent to the main gears. Such auxiliary means is preferably a link means between correponding portions of the two gears 59 and 60 for resisting lateral movement of the centers C of said gears towards each other, and such link means is usually rigid and inextensible rather than yieldable or extensible. As herein shown, the link means comprises a rigid metal link or bar 61 having its opposite end pivotally connected to the auxiliary gear by two threaded vertical pivot pins or screws 70 (FIGURE 3). The vertical turning axes at 70 are preferably diametrically opposite the turning axes at points P, and the fixed distance between the axes at 70 is preferably about equal to or slightly greater than the fixed distance between the axes at points P of the two auxiliary gears. If desired, the distance between the axes of the pin 70 may be 0.1 to 0.5 percent, greater than the distance between the points P of the auxiliary gears, and the distance from the vertical axis of each pin 70 to the center C may be substantially greater than the eccentricity e.

The steering mechanism of the present invention is particularly well suited for use with conventional hydraulic motors to effect power steering of heavy industrial trucks. The piston of a hydraulic cylinder may readily be connected to the bar 61 or the bar 62 to apply an equal turning force to each of the gears 59 and 60 without the disadvantage of play in gear teeth between the power source and the auxiliary gears. A novel positive steering control of the wheels 14 and 15 may thus be obtained which is not possible with a steering mechanism of the type shown in my Patent No. 2,982,564.

As herein shown, the housing of the hydraulic motor 24 is rigidly mounted on the guide plate 63 and the piston 25 of the hydraulic motor is parallel to and above the bar 62 and is pivotally connected to the enlarged externally cylindrical internally threaded portion 26 of the connecting member 68 by an elongated screw 29 coaxial with the member 68 as shown in FIGURES 2 and 3. The guide member 63 has an elongated slot 69 at each end large enough to receive the pins 68 and 68a and to permit reciprocation of the piston rod 25 through a distance sufficient to turn the wheels 14 and 15, about 90 degrees in either direction from the straight-ahead position of FIGURES 1 and 2.

Figure 4:
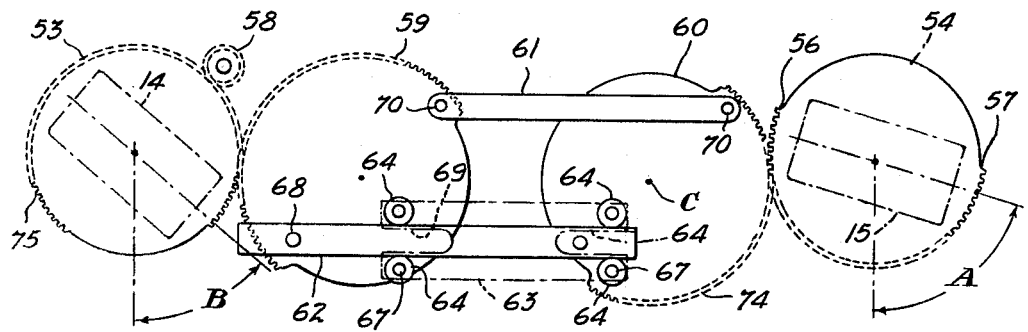
FIGURE 4 is a top view of the steering mechanism of FIGURES 1 and 2 with parts omitted showing one position of the circular gears.
Figure 5:
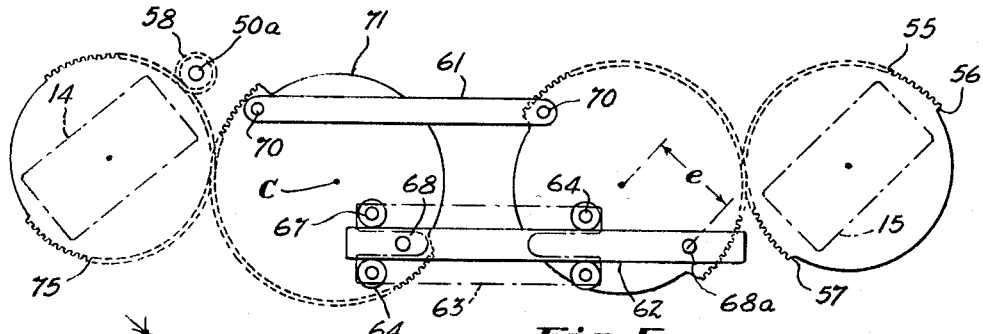
FIGURE 5 is a top view of the steering mechanism similar to FIGURE 4 but showing another position of the gears.

The steering gear mechanism of this invention is unusual, not only because of the novel power steering arrangement, but also because of its ability to position the traction wheels 14 and 15 positively and to provide the proper steering geometry as shown in FIGURE 6. In order to eliminate drag of the tires on the floor and to minimize tire wear, the angle A (FIGURES 4 and 6) between the axis 28 of the traction wheel 15 and the vertical plane, containing the line 33 and the vertical axes of the turrets 20 and 21, should be related to the angle B between the axis 34 and said vertical plane in accordance with the formula $$\cot B - \cot A = d/D$$

where $d$ is the lateral distance between said vertical axes and $D$ is the longitudinal distance between the lines 12 and 33. The steering mechanism of this invention is capable of providing a close approximation to this mathematical relationship so that the horizontal axes 28 and 34 of the traction wheels intersect near the horizontal axis 12 throughout the turning movement of the truck.

The relative size of the gears and the eccentricity $e$ needed to obtain the desired steering action will depend on the distances between the wheels and will vary considerably in different trucks. As herein shown, the auxiliary gears 59 and 60 are the same size and have a diameter greater than that of the main gears 53 and 54 and the eccentricity $e$ of each gear is the same and more than half the radius of the auxiliary gears. The large eccentricity provides a mechanical advantage and reduces the power needed to effect turning of the gears by the hydraulic motor 24.

The steering mechanism of the present invention may be symmetrical with respect to the longitudinal center line of the truck so that the same steering action is obtained whether the truck is making a left or right turn.

The exact size and shape of each of the gears 53, 54, 59 and 60 and other elements of the steering mechanism may vary considerably. If desired the toothed portions 55 and 75 of the main gears may have the same size and shape and the toothed portions 73 and 74 of the auxiliary gears may also be the same. The teeth of each auxiliary gear preferably have a uniform pitch radius throughout the length of the toothed portion 73 or 74, and the teeth of each main gear preferably have a substantially uniform radius throughout at least about half the circumference of the main gear. The links 61 and 62 are preferably connected to the auxiliary gears near the opposite ends of the toothed portions 73 and 74 and each of said toothed portions preferably extends at least about 180 degrees, but this is not essential. The position of the center C of each auxiliary gear 59 or 60 when the main gears are in the straight-ahead positions of FIGURES 1 and 2 may be on or near the line of centers 33 of said main gears or may be an inch or so away from said line of centers on the side remote from the guide 63.

In the steering mechanism shown herein the link 61 is on the same side of the auxiliary gears as the link 62 so that the guide 63 limits lateral movement of the link 61 relative to the line of centers 33. If desired, the bracket 65 may engage the link 61 and serve as a stop for limiting turning movement of the main gears to no more than about one-quarter revolution in either direction from the straight-ahead positions.

It will be understood that the above description is by way of illustration rather than limitation and that, in accordance with the provisions of the patent laws, variations and modifications of the specific devices disclosed herein may be made without departing from the spirit of the invention.

Having described my invention, I claim:

1. In a power steering mechanism for an industrial truck, a pair of laterally spaced wheel supports, means mounting said supports for turning about fixed vertical axes, a pair of horizontal main gears coaxial with and rigidly mounted on said wheel supports for turning about said axes, a pair of laterally spaced horizontal intermediate auxiliary gears of substantially the same uniform radius mounted between said main gears with the teeth of each gear meshing with the teeth of the adjacent main gear, said intermediate gears being mounted with their vertical axes located in a plane parallel to the plane containing the vertical axes of said main gears, a horizontal link parallel to the line of centers of said main gears and pivotally connected to corresponding points P on said intermediate gears which are spaced apart a distance substantially equal to the distance between the centers of said intermediate gears and which are spaced from the centers C of said intermediate gears, hydraulic motor means for reciprocating said link while holding the link parallel to the line of centers of said main gears to prevent movement of the link transverse to said line of centers and to cause the centers C of said intermediate gears to move transversely across said line of centers, and means for maintaining the intermediate gears in mesh with said main gears throughout the reciprocation of said link by said hydraulic motor means to turn said main gears, whereby said main gears are turned unequal amounts from their initial straight-ahead positions to effect steering.

2. In a power steering mechanism for an industrial truck, a pair of laterally spaced wheel supports, means mounting said supports for swinging movement about fixed vertical axes, a pair of horizontal main gears coaxial with and rigidly mounted on said wheel supports for turning about said vertical axes, a pair of laterally spaced horizontal intermediate auxiliary gears of substantially the same radius mounted between said main gears with the teeth of each intermediate gear meshing with the teeth of the adjacent main gear, said intermediate gears being mounted with their vertical axes located in a plane parallel to the plane containing the vertical axes of said main gears, the distance beween the centers of said main gears being at least 3 times the diameter of each main gear, a rigid link pivotally connected to corresponding eccentric points P on said intermediate gears which are located substantially in a line parallel to the line of centers of said main gears and which are spaced apart a distance substantially equal to the distance between the centers of said intermediate gears, means for reciprocating said link in a direction parallel to the line of centers of said main gears while preventing movement of said eccentric points transverse to said line of centers, and means constraining movement of said intermediate gears to cause the centers C thereof to move transversely of said line of centers and to cause the teeth of said intermediate gears to mesh with the teeth of said main gears throughout the transverse movement of said intermediate gears.

3. A power steering mechanism for industrial trucks comprising a pair of main gears of substantially the same radius, means mounting said gears for turning about fixed vertical axes, a pair of spaced intermediate auxiliary gears of substantially the same radius mounted between said main gears with the teeth of each auxiliary gear meshing with the teeth of the adjacent main gear, each auxiliary gear having a radius greater than that of the main gears and having teeth which remain in contact with the adjacent main gear when the main gears are turned 90 degrees in either direction from their straight-ahead positions, means mounting said auxiliary gears with their vertical axes located substantially in a plane parallel to the line of centers of said main gears, a link parallel to said line of centers and pivotally connected to corresponding eccentric points on said auxiliary gears which are spaced apart a distance substantially equal to the distance between the centers of said auxiliary gears, means for reciprocating said link while holding the link parallel to said line of centers and at a fixed distance from said line of centers, and means constraining movement of said auxiliary gears to cause the centers of said auxiliary gears to move transverse to said line of centers, and to hold the teeth of the gears in mesh throughout a 90-degree turn.

4. A steering mechanism of the character described having a pair of laterally spaced wheel supports mounted for swinging about fixed vertical axes, a pair of main gears mounted on said wheel supports for turning about said vertical axes, a pair of laterally spaced intermediate auxiliary gears mounted between said main gears with their vertical axes located substantially in a plane parallel to the line of centers of said main gears, the teeth of said gears extending circumferentially a distance such that the main and intermediate gears can remain in mesh when the main gears are turned about one-quarter revolution in either direction from their straight-ahead positions, a link pivotally connected to corresponding eccentric points on said intermediate gears which are located the same fixed distance from the line of centers of said main gears and which are spaced apart a fixed distance about equal to the distance between the centers of said intermediate gears, means causing said link to reciprocate a distance sufficient to turn the main gears about one-quarter revolution in either direction while preventing movement of said link transverse to said line of centers to cause the centers of said intermediate gears to move transverse to said line of centers toward and away from said link, and means for resisting bodily movement of said intermediate gears toward each other.

5. A steering mechanism for industrial trucks comprising a pair of widely spaced main gears of substantially the same radius, wheel-carrying means mounting said gears for turning about fixed vertical axes, a pair of spaced generally circular auxiliary gears of substantially the same diameter mounted between said main gears with their axes in vertical positions and with the teeth of each auxiliary gear meshing with the teeth of the adjacent main gear, the distance between the centers of said main gears being about 3 to about 5 times the diameter of each auxiliary gear, means constraining movement of said auxiliary gears to cause an eccentric point on each auxiliary gear spaced from its center a distance greater than half the radius of that gear to move in a direction substantially parallel to the line of centers of said main gears, said constraining means including a pair of parallel links pivotally connected to said auxiliary gears at diametrically opposed parts of each auxiliary gear.

6. A power steering mechanism for industrial trucks comprising a pair of spaced main gears of substantially the same radius, each having teeth extending throughout at least about half the circumference of the gear, means mounting said gears for turning about fixed vertical axes which are spaced apart a distance equal to about 5 to 10 times the radius of each main gear, a pair of spaced auxiliary gears having vertical central axes located in a plane substantially parallel to the line of centers of said main gears and having teeth extending circumferentially a sufficient distance to remain in mesh with the teeth of said main gears when the main gears are turned up to 75 degrees in either direction from their straight-ahead position, means constraining movement of said auxiliary gears to cause an eccentric point P on each auxiliary gear spaced from its center C a distance greater than half the radius of that gear to move along a fixed line substantially parallel to said line of centers, said constraining means comprising a link pivotally connected to each auxiliary gear at said eccentric point, power means for reciprocating said link while preventing movement thereof transverse to said line of centers, and means for resisting movement of the center of each auxiliary gear away from the adjacent main gear.

7. A steering mechanism for an industrial truck comprising a pair of spaced main gears of substantially the same radius, means mounting said main gears for turning about fixed vertical axes which are spaced apart a distance equal to at least 5 times the radius of each main gear, a pair of spaced auxiliary gears having vertical axes located in a plane substantially parallel to the line of centers of said main gears, the main and auxiliary gears having teeth which remain in mesh when the main gears are turned 75 degrees in either direction from their straight-ahead positions, link means constraining movement of said auxiliary gears to cause an eccentric point on each auxiliary gear spaced from its center to move along a fixed path substantially parallel to said line of centers, said link means having an effective length substantially equal to the distance between the vertical axes of said auxiliary gears and being pivotally connected to the corresponding eccentric points on said auxiliary gears, a double-acting hydraulic power cylinder having a reciprocable piston connected to said link means, means for holding said auxiliary gears in mesh with said main gears as the main gears are turned at least 75 degrees in either direction from their straight-ahead positions, a steering control shaft having a pinion gear operably connected thereto and meshing with the teeth of one of said gears, and valve means connected to said control shaft to control flow of hydraulic fluid to said power cylinder.

8. A steering mechanism for an industrial truck comprising a pair of spaced main gears of substantially the same radius, means mounting said main gears for turning about fixed vertical axes which are spaced apart a distance equal to at least 5 times the radius of each main gear, a pair of spaced auxiliary gears having vertical axes located in a plane substantially parallel to the line of centers of said main gears, the main and auxiliary gears having teeth which remain in mesh when the main gears are turned 75 degrees in either direction from their straight-ahead positions, a rigid link pivotally connected to said auxiliary gears at corresponding eccentric points located substantially the same distance from the line of centers of said main gears, means causing reciprocation of said link while preventing movement of said link transverse to said line of centers to turn the main gears at least 75 degrees in either direction, and a second link with a length at least about equal to that of said rigid link pivotally connected to portions of said auxiliary gears diametrically opposite the pivotal connections to said rigid link to resist movement of each auxiliary gear out of mesh with its associated main gear.

9. A power steering mechanism comprising a pair of spaced main gears, a pair of spaced auxiliary gears located between said main gears with their teeth meshing with the teeth of said main gears, a pair of parallel links of substantially the same effective length pivotally connected to diametrically opposed portions of each auxiliary gear, power means for reciprocating one of said links and for holding one of said links against movement transverse to the line of centers of said main gears, and means for holding each auxiliary gear in mesh with its associated main gear while the main gears are rotated up to one quarter revolution in either direction from their straight-ahead positions.

10. A power steering mechanism for an industrial truck comprising a pair of widely spaced wheel supports mounted for turning movements about vertical axes, a pair of main gears mounted on said wheel supports with their centers at said axes, a pair of spaced auxiliary gears mounted between said main gears with their axes located in a vertical plane substantially parallel to the line of centers of said main gears, a rigid link parallel to and spaced from said line of centers and pivotally connected to corresponding eccentric points on said auxiliary gears which are spaced apart a distance substantially equal to the distance between the centers of said auxiliary gears, a guide having means for holding said link parallel to said line of centers, means for causing reciprocation of said link and turning of said gears, and link means parallel to said rigid link and pivotally connected to the opposite sides of said auxiliary gears for resisting bodily movement of said auxiliary gears towards each other.

11. A power steering mechanism as defined in claim 10 wherein said first-named link is a straight bar, said link means comprises a rigid link having an effective length at least equal to that of said bar, said guide has a series of anti-friction rollers engaging opposite sides of said bar, and said means for causing reciprocation comprises a hydraulic cylinder rigidly connected to said guide and a reciprocating piston parallel to said bar and connected to said bar.

12. In a vehicle having a frame and front and rear pairs of supporting wheels, the combination which comprises a support for each of the rear wheels journaled in said frame for turning movements about a substantially vertical axis, motor means carried by each wheel support for driving the rear wheel carried by that support, gearing connecting said wheel supports and constraining them to turn simultaneously in the same direction comprising a pair of laterally spaced intermediate toothed gears of substantially the same radius having vertical central axes and rotary means connecting each of said intermediate gears to one of said supports, said rotary means comprising a main gear in meshing engagement with each of said intermediate gears and connected to one of said wheel supports to turn the same, the main gears having laterally spaced vertical axes, means for effecting turning movement of one of said intermediate gears in either direction from an initial position in which said rear wheels are in their parallel straight-ahead positions, and means controlled by turning movement of said intermediate gear in either direction from said initial position for causing both of said intermediate gears to move bodly in generally the same direction transverse to the line of centers of the two main gears while holding the intermediate gears in mesh with the main gears, said last-named means including link means generally parallel to said line of centers and pivotally connected at its ends to the intermediate gears at corresponding points, each of which points is spaced a substantial distance from the center of the intermediate gear, and hydraulic motor means for effecting movement of said link means in a direction parallel to said line of centers.

13. A four-wheeled industrial truck having a pair of aligned laterally spaced supporting wheels near one end of the truck and a pair of laterally spaced motor-driven traction wheels near the opposite end of the truck; a support for each traction wheel journaled for swinging movement about a substantially vertical axis; a power unit on each support for driving the traction wheel; means for turning the wheel supports simultaneously in the same direction from positions wherein the traction wheels are parallel to steer the truck including a pair of main gears of substantially equal radius mounted on said wheel supports to turn the same, each gear being mounted to turn about a vertical axis at its center; and a pair of spaced intermediate gears having vertical axes located in a plane parallel to the plane containing the vertical axes of the main gears, means for holding each intermediate gear in mesh with the adjacent main gear, means for causing the intermediate gears to move bodily in unison in a direction transverse to the line of centers of said main gears while turning about corresponding points (P) spaced from their centers (C) comprising a rigid link pivotally connected at its opposite ends to the intermediate gears at said corresponding points and means for guiding said link in a direction parallel to said line of centers, and power means for rotating said intermediate gears to effect steering of the truck including a reciprocating double-acting hydraulic motor connected to said rigid link and a manually-controlled valve for controlling delivery of fluid under pressure to said motor.

References Cited by the Examiner
UNITED STATES PATENTS

| | | | |
|---|---|---|---|
| 2,713,918 | 7/1955 | Framhein | 180—52 |
| 2,732,904 | 1/1956 | Schroeder | 180—79.2 |
| 2,848,247 | 8/1958 | Schreck | 280—96 |
| 3,069,183 | 12/1962 | Williamson | 280—93 |
| 3,189,366 | 6/1965 | Ulinski | 280—93 |

KENNETH H. BETTS, *Primary Examiner.*